United States Patent
Le Pennec et al.

(10) Patent No.: US 7,299,353 B2
(45) Date of Patent: Nov. 20, 2007

(54) FIREWALL SYSTEM FOR INTERCONNECTING TWO IP NETWORKS MANAGED BY TWO DIFFERENT ADMINISTRATIVE ENTITIES

(75) Inventors: Jean-François Le Pennec, Nice (FR); Aurélien Bruno, Nice (FR); Nicolas Grisi, La Colle sur Loup (FR); Jean-Marie Sommerlatt, Le Raincy (FR)

(73) Assignee: AT&T Corp., New York, NY (US)

( * ) Notice: Subject to any disclaimer, the term of this patent is extended or adjusted under 35 U.S.C. 154(b) by 646 days.

(21) Appl. No.: 10/638,839

(22) Filed: Aug. 11, 2003

(65) Prior Publication Data

US 2004/0049701 A1   Mar. 11, 2004

(30) Foreign Application Priority Data

Sep. 5, 2002  (FR) .................................. 02 11007

(51) Int. Cl.
*G06F 1/24* (2006.01)
(52) U.S. Cl. ...................... 713/159; 713/161; 713/162; 713/168; 713/193
(58) Field of Classification Search ................ 713/154, 713/161, 162, 168, 193
See application file for complete search history.

(56) References Cited

U.S. PATENT DOCUMENTS 5,819,019 A * 10/1998 Nelson ........................... 714/4
5,953,707 A * 9/1999 Huang et al. .................. 705/10
6,067,634 A * 5/2000 Nelson ........................... 714/4

FOREIGN PATENT DOCUMENTS

EP         0 909 074       4/1999
WO         WO 99-48261     9/1999

OTHER PUBLICATIONS

Preliminary Search Report for corresponding French Application, FR 0211007 dated May 6, 2003.

* cited by examiner

*Primary Examiner*—Thomas R. Peeso

(57) ABSTRACT

Firewall system for interconnecting a first IP network (10) to a second IP network (16), these networks belonging to two different entities having each a different administration wherein any data packet transmitted/received by the first IP network is filtered by using a first firewall function and any data packet transmitted/received by the second IP network is filtered by using a second firewall function. The system comprises essentially a single firewall device (20) including filtering means (41, 43) performing both first firewall function and second firewall function, a console port (37) enabling the administrator in charge of each IP network to enter filtering rules for updating the associated firewall function and control means (39, 47, 49) interconnecting the console port and the filtering means for transmitting thereto the filtering rules so that each administrator may independently manage the system from the console port.

11 Claims, 5 Drawing Sheets

FIREWALL SYSTEM FOR INTERCONNECTING TWO IP NETWORKS MANAGED BY TWO DIFFERENT ADMINISTRATIVE ENTITIES

TECHNICAL FIELD

The present invention relates generally to firewall mechanisms which are used to connect two data transmission networks such as Intranet networks belonging to two different entities each having a specific administrative control, and in particular to a firewall system for interconnecting two IP networks managed by two different administrators.

BACKGROUND

Today, network security techniques are using a firewall, which is generally known as a combination of hardware and software used to implement a security policy governing network traffic between two or more networks, some of which may be private as being under administrative control of a customer or network provider (e.g., organizational networks) and some of which may not be under administrative control (e.g., the Internet) also called a public network. A network firewall commonly serves as a primary line of defense against external threats to an organization's computer systems, networks, and critical information. Firewalls can also be used to partition networks isolate or interconnect VPNs.

Using other words, a Firewall is a system designed to prevent unauthorized access to or from a private network. Firewalls are frequently used to prevent unauthorized Internet users from accessing private networks connected to the Internet, especially Intranets having firewalls can also be used between two Intranets. All messages entering or leaving the Intranet pass through the firewall, which examines each message and blocks those that do not meet the specified security criteria. They may also be used to interconnect private networks managed by two different administrative entities. In that case, generally, two firewalls are cascaded with an intermediate link called a DMZ, each firewall being managed by a different administrative authority.

Firewalls perform various decision-making processes and principally the in particular perform packet filtering which consists of looking at each packet entering or leaving the associated network and accepting or rejecting this packet based on user-defined rules. However, other security-related functions can be implemented in a firewall such as an application gateway by applying a security mechanism to specific applications such as FTP and Telnet servers, circuit-level gateway by applying a security mechanism when a TCP or UDP connection is established and a proxy server which enables the establishment of a connection on behalf of a client between the proxy server and destination device.

In addition to these security-related functions, firewalls can also perform routing functions that are associated with the network being protected and that are conventionally associated with a separate/individual router. Routing is the process of deciding the disposition of each packet that a routing device handles. This applies to incoming packets, outbound packets leaving a network for external destinations, and packets being routed among internal networks. Ultimately, there can be only two possibilities for the packets: forward or discard. The routing mechanism uses a routing table and a destination IP address in the packet header to make a decision.

A routing configuration that reflects the network topology is generally used so that the firewall is able to deliver legitimate packets to their desired destinations. A firewall routing table contains a list of IP network addresses for which the firewall is intended to provide routing services. If the lookup of the routing table is successful for a packet, the table provides either the address of the next router to send the packet or the interface to be used for sending the packet out. If the table lookup fails, the packet is discarded and an ICMP "unreachable" message is generally returned to the source indicating that the packet was undeliverable.

However, such routing mechanism is too dynamic and unreliable and cannot be used to implement a security policy. As such, a security technique called stateful inspection or dynamic packet filtering is often used. Whereas classic packet filtering is based only on header information on each individual packet without considering any prior packets, the stateful inspection filtering allows both complex combinations of payload (message content) and context established by prior packets to influence filtering decisions. As with packet filtering, stateful inspection is implemented as an "add-on" to routing. The principle motivation for stateful inspection is a compromise between performance and security. As a routing "add-on," stateful inspection provides much better performance than the proxies. It also provides an increase in the level of firewall function beyond simple packet filtering. Like proxies, much more complex access control criteria can be specified and like packet filtering, stateful inspection depends on a high quality (i.e. correct) underlying routing implementation.

But, in any case, two physically different firewalls are implemented one after the other in an interconnection between Intranet networks because each network is administratively managed by a different organization that wants to have a dedicated administrative access to the firewall for defining rules and taking logs. Some of the rules are common but are run twice which decrease the overall system performance. The expense and complexity are high, and reliability is low because two serial devices are used. Configuration is more complex because there is an additional link between the two firewalls.

SUMMARY OF THE INVENTION

Accordingly, the main object of the invention is to replace the classic firewall system having two physically different firewalls in series by a firewall system having a single firewall device for interconnecting two IP networks belonging to two different entities and managed by two different administrations.

The invention relates therefore to a firewall system for interconnecting a first IP network to a second IP network, these networks belonging to two different entities having each a different administration wherein any data packet transmitted or received by the first IP network is filtered by using a first firewall function and any data packet transmitted or received by the second IP network is filtered by using a second firewall function. The system comprises essentially a single firewall device including filtering means for performing both a first firewall function and a second firewall function, a console port enabling the administrator in charge of administrating each IP network to enter filtering rules for updating the associated firewall function and control means for interconnecting the console port and filtering means for transmitting filtering rules so that each administrator may independently manage their respective system from a console port.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

Figure 1:
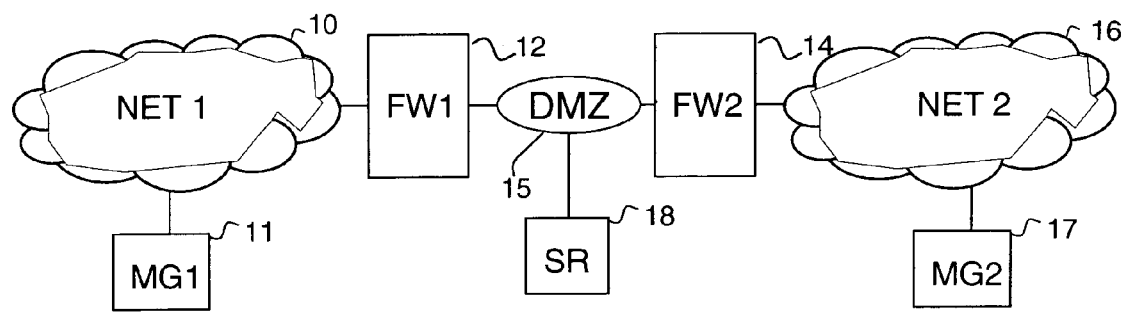
FIG. 1 is a block-diagram of a prior system including two firewalls for interconnecting two IP networks belonging to two different entities having two different administrators.

FIG. 1 shows a classic system where two networks NET1 10 and NET2 16 belonging to two different administrative entities, are securely interconnected via a complex firewall system comprising a first firewall FW1 12 and a second firewall FW2 14. The administrator, referenced as MG1 11 of NET 1, manages FW1 while the administrator of MG2 17 of NET2 manages FW2. A LAN 15 interconnects FW1 and FW2 which is, in this example, a demilitarized zone DMZ 15 shared by the two companies. Common servers may be implemented in this zone such as a web server SR 18. Both entities may use such a server. Such a zone is also called a community of interest COI.

Figure 2:
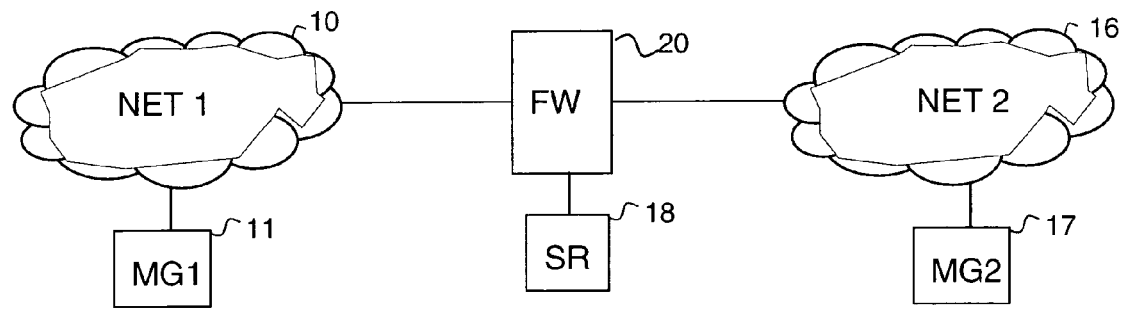
FIG. 2 is a block-diagram of the same system as the one illustrated in FIG. 1 but wherein the two firewalls have been replaced by a single firewall according to the invention.

The system illustrated in FIG. 1 is expensive and adds an overhead to the path since firewall processing is performed twice. Furthermore, any failure on one of the two firewalls stops traffic. These drawbacks are overcome by the Firewall system according to the invention illustrated in FIG. 2 wherein the two firewalls FW1 and FW2 are replaced by a single physical device FW 20 which can also provide a locally demilitarized zone to connect an externally shared server such as SR 18. The single firewall 20 allows MG1 11 and MG2 17 to manage respectively manage their logical firewall part within the dual firewall system.

In such a system, no visibility to the configuration on one side is provided to the administrator of the other side but the rules that can be aggregated allow optimizing the performance of the solution. Therefore the cost of such implementation will be lower and the reliability better.

Figure 3:
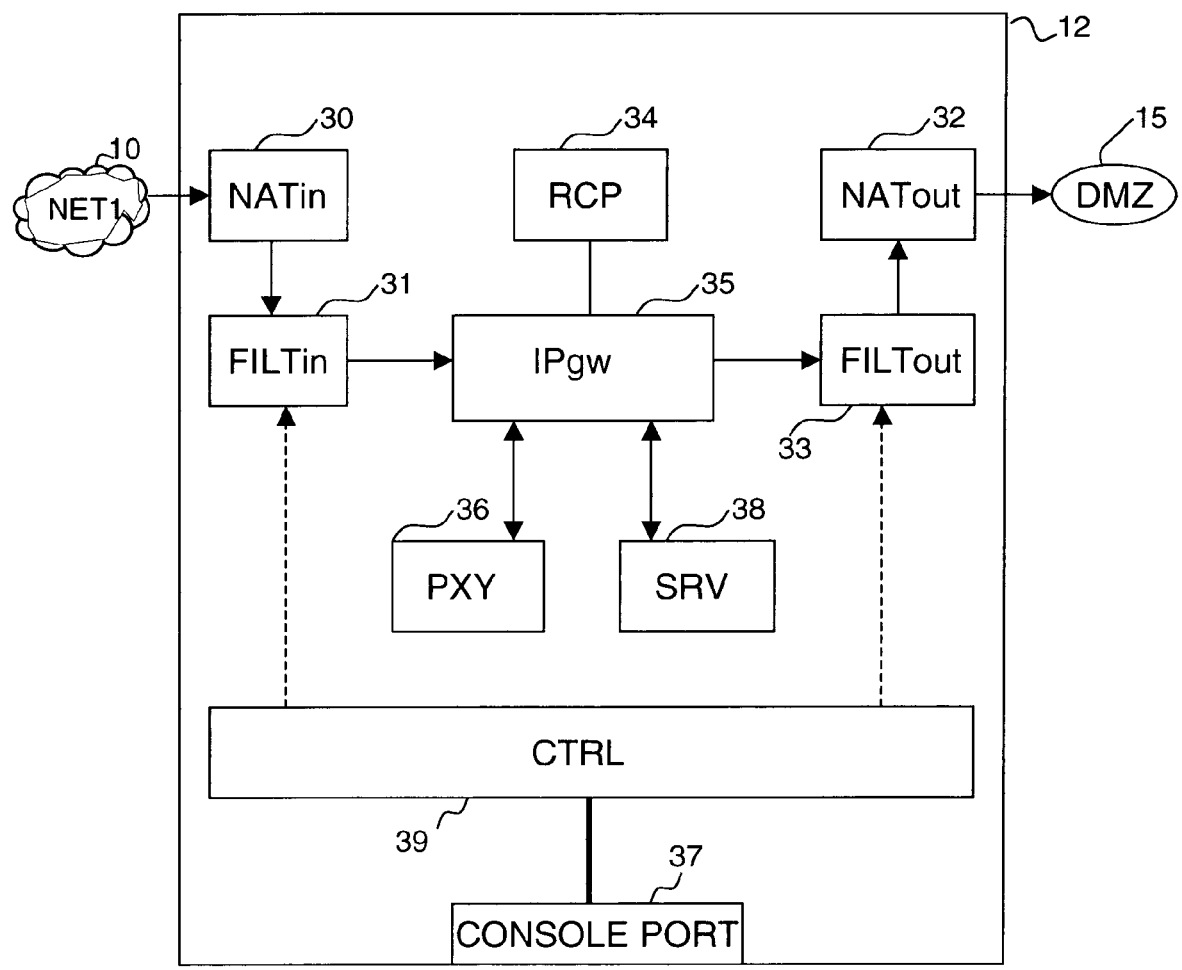
FIG. 3 is a block-diagram representing the functional blocks of a firewall device.

A standard firewall with its functional blocks is represented in FIG. 3. Note that a firewall is normally divided into two devices which are functionally identical for the two data paths except for the stateful inspection mechanism which includes an additional control flow between the transmit and receive sides. Insofar as the functional blocks are the same for the two data paths, only the firewall device controlling the data path outputting from the NET1 is represented in FIG. 3.

The functional blocks of the firewall include in transmission order from NET1 10 to DMZ 15, a first Network Address Translation (NAT) function NATin 30, which is optional insofar as the NAT is necessary only if there is a mapping rule for changing the source IP address, and for forwarding data to a second block called FILTin 31. The latter function performs filtering on the input interface and forwards granted packets to IPgw 35, which is the forwarding engine of the firewall. A routing decision is based on routing defined by the routing control point RCP 34. RCP maintains the routes with its peer routing devices and updates the forwarding table of the IP gateway 35. Based on these rules, a packet may be sent to an integrated function, such as an application proxy PXY 36 or a server entity SRV 38 for authentication, encryption or other service module like DHCP service. It may also be sent to RCP if the packet is a routing update message. Otherwise, the main path is to forward the packet to the output interface. In that case, the packet has again to path through two blocks: a first filtering block for output packets FILTout 33 followed by a second NAT function NATout 32. This second NAT is active only if there is a mapping rule for changing the destination IP address. Then, the packet is sent out of the firewall, into the DMZ 15 in the example. The need for output filtering and NAT is mainly for packets modified in the proxy and servers for which the input rules are irrelevant. These blocks should exist even if the NAT functions are not used.

In the filtering block 31, filtering rules determine whether or not a packet will be allowed through IP Filtering, into the kernel's TCP/IP routines or out onto the network. The Access List based Static filtering filters the packets using statically configured filters based on the following fields:

Range of Source and Destination addresses

Protocol Type (e.g. TCP, UDP, ICMP, IGMP, RSVP, OSPF, IGP, EGP, NVP)

Source and Destination Port numbers

TOS (Type of Service) field

IP Options

IP Fragmentation

ICMP type and code

Ack and Rst bit of TCP

For IP Accounting, input and output rules can be also separately setup, recording the number of bytes that pass through. Each time a rule match occurs, the byte count of the packet is added to the rule (allowing for cascading statistics to be collected). IP accounting data may be kept either in the filtering module or in the IP Gateway module IPgw 35. Raw data is given to control block CTRL 39 which gathers the data so as to provide it to the administrative entity. IP routing in IPgw 35 is a option that allows for forwarding packets according to routing rules defined in the routing control point RCP. Server 38 and proxy 36 support may also be included.

Other functions may be integrated in server 38 or proxy 36 such as the IP Authentication function. In that case, packets which are authenticated, are only passed through the firewall loops once to prevent double-processing.

Encryption such as IPsec tunneling is a function very often used in a firewall. As it is not possible to scan an encrypted tunnel, the decrypted packet coming from the encryption module will have to path through the output filtering function and therefore will be scanned.

It must be noted that control block CTRL1 39, administrating the firewall performs user (administrator of the firewall) authentication, configuration, log, statistics and problem determination so it has a link to any of the internal functional blocks (the links are not shown on the drawing as being not functional paths but only control means). The access to the firewall for administration can be always done through CONSOLE PORT 37. The configuration may allow as well access to control CTRL 39 from NET1 or DMZ sides even if the latter is not recommended for security reasons.

Figure 4A:
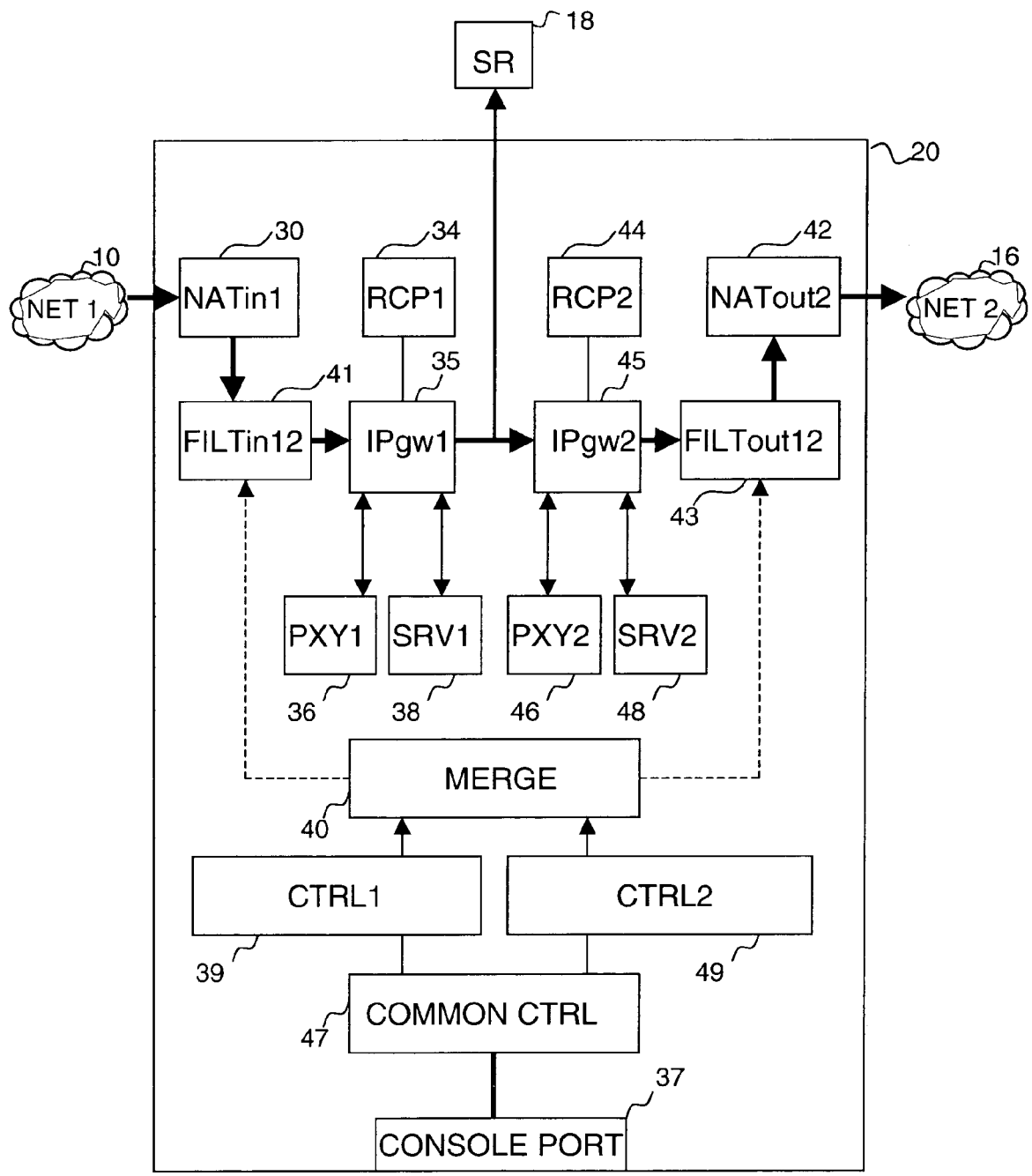
FIGS. 4A and 4B are block-diagrams representing respectively the functional blocks of a firewall system according to the invention for the data path from the first network to the second network and for the data path from the second network to the first network.
Figure 4B:
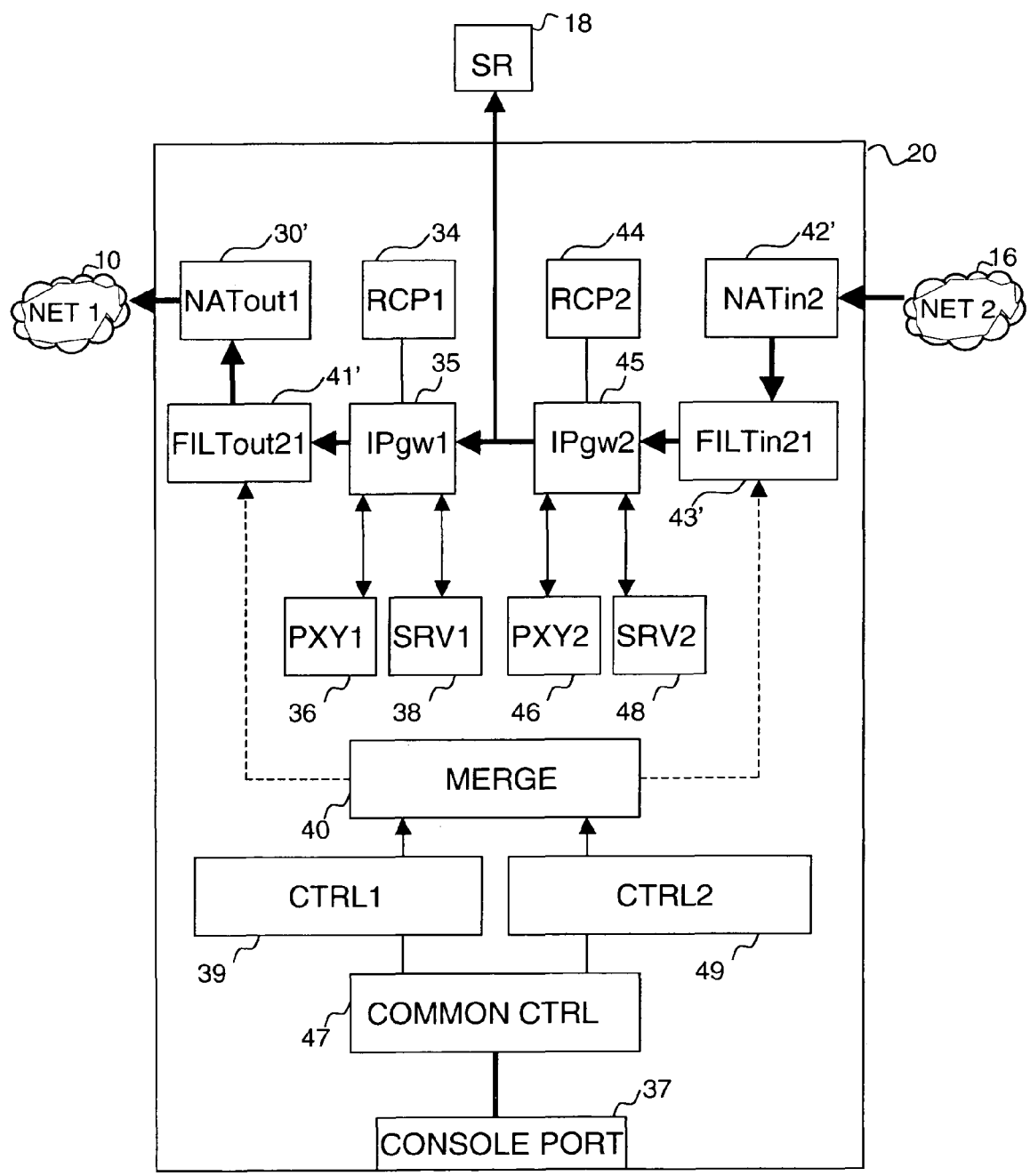

According to the invention, a single firewall device illustrated in FIG. 4A and 4B replaces the two classical cascaded firewalls. As explained hereafter, the functional blocks are the same as in a classical firewall but they are not duplicated in two firewalls. In reference to FIG. 4A representing the firewall for data path from NET1 to NET2, the first and last functions are the network address translation in blocks NATin1 30 and NATout2 42. The associated rules may be needed between the input interface and the internal DMZ or between the DMZ and the output interface or both. The rules require the following parameters Original Source, Original Destination, Original Service referring to the source and destination address and service of the packet before translation and Translated Source, Translated Destination, Translated Service referring to those parameters after translation.

A type of translation parameter (for example SNAT as static NAT, DNAT as Dynamic NAT, MASQUERADING also called Port address translation).

The administrator of the locally attached network only manages NAT on its local interface. So only one input NAT NATin1 30 is implemented on NET1 side and managed by the NET1 administrator while the output NAT NATout2 42 is interfacing NET2 and managed by the NET2 administrator.

As in a classical firewall, an essential function is the filtering, as already mentioned in reference to FIG. 3, achieved in the block FILTin12 41. Some rules are associated with this function, such as Sequence Number Hardening rules, Stateful Inspection rules, Time-Sensitive Rules, Static Filtering Rules Per logical firewall split between input and output filtering blocks. Insofar as the data packets can be processed by further functions in a server or a proxy as already mentioned, another filtering block FILTout12 43 is necessary before NATout2 42. The function of the output block is the same as the function of the block FILTin12 located at the input.

Importing/Exporting routing Rules are also defined for all packets but set by each administrator on the corresponding IP gateway also called Virtual routing and forwarding engine referenced as IPgw1 35 and IPgw2 45 located between blocks FILTin12 41 and FILTout12 42. Each gateway gets the forwarding rules thanks to a dedicated Routing Control Point RCP1 34 and RCP2 44 respectively managing and advertising the routes for IPgw1 and IPgw2. The administrators must exchange some information for providing route advertisement between these two gateways but no common block is required for that in a design using two different gateways. An optional design based on a single shared IP gateway is feasible when no routing visibility constraint exist between the two external networks NET1 and NET2 or if the IP gateway can be managed by only one of the administrator, the other one advertising its network routes thanks to an external router to the internal IP gateway and associated Routing Control Point.

IP accounting information, gathered by one administrative entity from functional blocks such as NAT 30 and 42, FILTERING blocks 41 and 43, and IP gateways 35 and 45, is stored in dedicated control block either CTRL1 39 or CTRL2 49. Global statistics of the aggregated traffic are stored in COMMON CTRL 47.

Other dedicated administrative functions such as Email Notification, network management and Password security are managed separately in CTRL1 39 and CTRL2 49. Original firewall configuration from each administrator is also kept in the respective control block. The security and integrity of each part of the configuration are achieved thanks to certified configuration (certificates) that allows reducing to a single equipment this dual entity without security issue.

The existing dedicated proxy such as PXY1 36 and PXY2 46, and server functions such as SRV1 38 and SRV2 48 continue to be dedicated in the proposed design being each attached to the corresponding IPgateway block respectively IPgw1 35 and IPgw2 45.

The connection from IPgw1 to IPgw2 may be considered as the remaining DMZ and may provide an external connection for external servers such as SR 18.

FIG. 4B shows the flow for traffic from NET2 16 to NET1 10. Most of the functional blocks are common with the opposite flow described in FIG. 4A since they are the same blocks as for legacy simple firewalls.

The main differences concern blocks NATin2 42' and block FILTin21 43' on NET2 side and blocks NATout1 30' and block FILTout21 41' on NET1 side.

NATin2 42' has a strong relationship with NATout2 42 since, as soon as one NAT mapping is defined in one of the two blocks, the reverse mapping has to be activated on the other block as a swap back function. Similarly NATout1 30' and NATin1 30 have the same link between them.

FILTin21 and FILTout12 have no relationship except for stateful inspection rules insofar as one flow identified on one side will be granted on the other side. This means that dynamic rules are added on both blocks thanks to the stateful inspection function as done for legacy firewalls. The same stateful link may be implemented between FILTout 21 and FILTin12.

Referring again to FIG. 4A and 4B, an essential feature of the invention is the MERGE block 40 used to merge the rules. Before explaining the merging process, it is useful to mention that the filtering mechanism of a firewall applies the rules in a sequence mode by using a list of rules. If the incoming packet matches the first rule, it exits the filtering block and is forwarded to the next firewall functional block. If not, the second rule is applied and so on. Normally it should match a rule. For security reasons, the last rule applied is an implicit rule to deny all the unmatched messages. The unmatched messages are messages which have not matched a rule before the end of the rule sequence. As the last rule is most often a "deny all", a packet arriving at this last rule is discarded. In a dual firewall mechanism according to the invention, it is therefore essential to merge the rules so as to apply a reduced number of rules.

The merging process is done independently for FILTin12 or FILTout12. Thanks to this mechanism, the dual administrated Firewall can check for redundant rules from each administrator in order to optimize the performance. Neither of the two administrators may gain access to the result of the merging in order to protect the rules knowledge but the administrator of each side can identify that his rules have been correctly implemented thanks to the identification of the merging done rule by rule.

In a classical system, the cascade of two firewalls means that on each direction output rules on one firewall are followed by input rules on the second firewall. This is no longer the case with the proposed rules merging function since most of the filtering rules can be run once in a simplified model integrating the two logical firewalls as it will be explained with more details hereafter.

Two sets of logs are built and managed by CTRL1 and CTRL2 insofar as each rule even after merging is identified with its parent rule from each side. Each administrator may define each information, rule or file as common or local so that some logs or alarms for example may be shared. In that case, the control is given to the common control Block COMMON CTRL 47 which handles all common features, files and services. The Common features include the Configuration Interface used by both administrators to set each new configuration from each side, the Activity Viewer which shows in real time the traffic from NET1 to NET2 including the DMZ activity, the Logging mechanism of alerts and events that defines to which block CTRL1, CTRL2 or COMMON CTRL the events have to be stored, the hardware management for installation and problem determination and the user authentication interface as a common mechanism required to identify administrators of each logical firewall entity on login request coming from CONSOLE PORT 37 or interfaces with NET1 or NET2.

For comparison, a legacy firewall includes as control block what is in CTRL1 and COMMON CONTROL except that in such case, identification to which logical firewall the user belongs is not necessary and logging of traffic information does not have to be define since only one set of log files is available.

An administrator may allow or not the access to the other side of the firewall administration on its direct access interface. On a legacy firewall, the administration using for example telnet is feasible from any interface. Of course, the administrator can lock some ports such as the public network interface. On a dual firewall, the administrator of each side manages this authorization and therefore the access using other ports or interfaces than the one dedicated to its network may be locked. This means that the port lock cannot be done at the protocol level, for example authorizing telnet or not on a port, because the administrator of one side wants to keep this protocol access on an interface for himself but not for the administrator of the other side. A more complex filtering mechanism using an external authentication server such as TACACS or RADIUS is recommended to securely authenticate the user and its rights to one side or the other of the dual firewall. If there is a need to allow administration from the different interfaces, the authentication servers of the two administrative entities should be linked together to allow forwarding of the authentication to the appropriate server.

Figure 5:
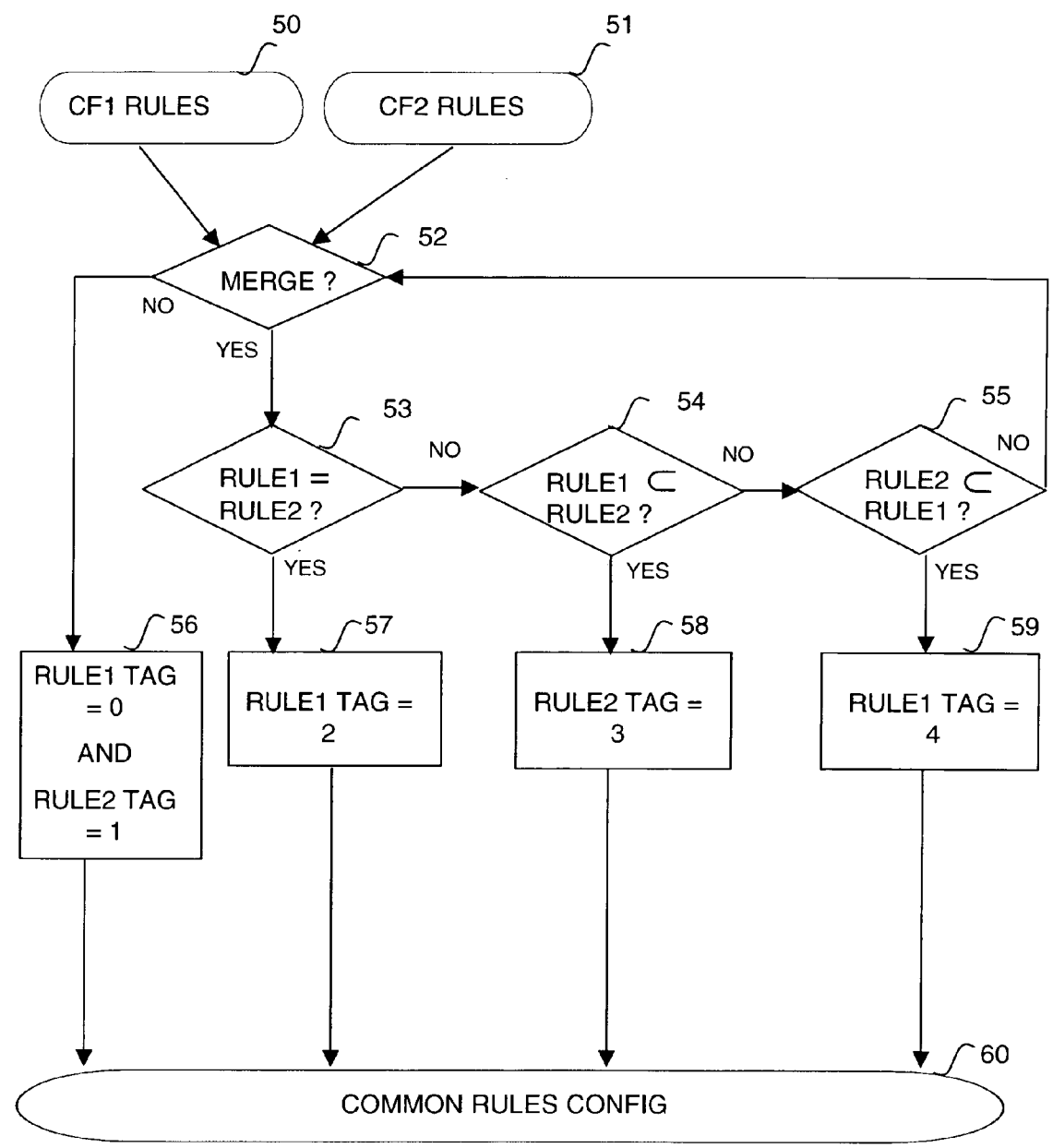
FIG. 5 is a schematic diagram representing the method achieving the rule merging.

In reference to FIG. 5, a merge function using 2 input configuration files 50 and 51 has to be considered. The merge function has to take into account the rules that can be fully merged or partially merged and the order to apply them against the remaining set of rules. It is based on a tree per configuration that allows a new common tree to be built and then leaf merged.

The remaining merged set of rules becomes the applied common set of rules. Whether this configuration file is visible to both administrative entities or visible to only one or none of them depends on the agreement between companies.

In order to explain how rules can be merged, it is necessary to detail how, in a standard firewall, the filtering rules are built with the same structure for defining them which looks like the following set of fields by rule: "Action", "ProtocolType", "@sourceA", "@destinationB", "PortNumber", "Options".

The fields value or content may be as an example:

"Action" is Permit or Deny

"Protocol Type" defines the protocol on which this rule is applied (i.e. IP, TCP, UDP . . . )

"@sourceA" describes the Source IP address of IP Datagram

"@destinationB" describes the Destination IP address of IP Datagram

"PortNumber" defines the specific port number related of the chosen protocol

"Options" defines the additional parameters which can be set to create rules more precise (i.e. Tos, Dscp, . . . )

In the firewall system according to the invention the two administrators can define the filtering rules. To know which administrator has defined the rules an implicit Tag is added in the rule structure.

This tag is coded with 3 bits and has 5 different states:

"0" coded "000": describes that this rule has been defined in CTRL1 39,

"1" coded "001": describes that this rule has been defined in CTRL2 49,

"2" coded "010": describes that this rule has been defined in CTRL1 39 and in CTRL2 49, "3" coded "011": describes that the rule defined in CTRL2 49 includes the rule defined in CTRL1 39, "4" coded "100": describes that the rule defined in CTRL1 39 includes the rule defined in CTRL2 49.

In order to separate action logs (for debugging purpose) by Control Block CTRL1 39 and CTRL2 49 and using a secure way, a point of reference makes the correspondence between the Tag Number and at which Control Block the rule is referring to:

Tag Value=0 then Control Block of reference is CTRL1 39,

Tag Value=1 then Control Block of reference is CTRL2 49,

Tag Value=2 then Control Blocks of reference are CTRL1 39 and CTRL2 49,

Tag Value=3 then Control Block of reference is CTRL2 49,

Tag Value=4 then Control Block of reference is CTRL1 39.

The first step is to compare a rule from the configuration file CF1 50 (defined through CTRL1 39) with rules from the configuration file CF2 51 (defined through CTRL2 49) in order to check whether a CF1 rule can be merged with one of the CF2 rules. When a rule processing is completed, the next rule from CF1 is put in the merging process block 40.

The checking process for identifying a possible merge is done in step 52. The comparison is done against the 5 fields of a rule as mentioned above.

The minimum requirements to merge two rules are to have the same Action, the same Protocol and the same Port number if present plus overlapping Source Addresses and/or Destination Addresses.

If these requirements are met then the rules can be merged and the checking process 52 forwards the corresponding rules to the checking process 53.

If one requirement is missing, then the rules cannot be merged and then the checking process 52 forwards the rules to the process 56.

The process 56 modifies rule1 and rule2 by adding the appropriate TAG values (0 for rule1 and 1 for rule 2) and placing the two rules in the rule config file 60. The corresponding rule2 with TAG=0 is kept in CF2 rules config file 51 as it can be merged with a next CF1 rule. In that case the TAG value in COMMON RULE CONFIG 60 may be overwritten When a merge is possible, the step 53 checks if the two rules (rule1 and rule2) are the same. If Yes, this process sends only the rule1 to the process 57, which modifies the rule1 by adding the TAG value 2 and put it in the rule config file 60. If the rule1 and rule2 are in some aspect different then the two rules are forwarded to step 54.

Step 54 checks if rule1 is included in term of Source/Destination addresses in rule2.

If yes, the process 54 sends rule1 to the process 58 which modifies rule1 by adding the tag value 3, and sends it in the rule config file 60. If rule1 is not included in rule2 then the two rules are forwarded to step 55.

Step 55 reversely checks if rule2 is included in term of Source/Destination addresses in rule1.

If yes, the process of step 55 sends rule2 to step 59 which modifies the rule by adding the tag value 4 and put it in the rule config file 60 If the rule2 is not included in rule1 then the two rules are re-forwarded to the checking process 52, which knows that these rules have been already checked, and then send them to the process of step 56, as they cannot be merged in an improved way.

Note that the Rule inclusion is different whether the rule is a DENY or PERMIT rule.

A PERMIT rule A is included into another permit rule B if subnet space—source or destination—of the former is larger than the one of the latter. The most restrictive one in terms of addressing space is kept: rule B.

A DENY rule A is included into another deny rule B if subnet space—source or destination—of the former is smaller than the one of the latter. The most restrictive one is kept: rule B.

When two rules match, the checking with the remaining part of the list is stopped. An improved merging process with more than one pass is possible. It may be recommended when the number of rules is very important. It that case, multiple inclusion of rules may be used.

The merging process will be better understood with the following example wherein the list of CF1 rules and the list of CF2 rules are as follows:

CF1 List of Rules

| Permit | TTCP | 172.20.0.0 | 192.0.0.0 | 23 |
| Permit | ICMP | any | any | |
| Deny | IP | 192.168.10.0 | 192.168.20.0 | |

CF2 List of Rules

| Permit | ICMP | 172.0.0.0 | 192.168.0.0 | |
| Permit | TCP | any | any | 23 |
| Permit | UDP | 172.0.0.0 | 192.0.0.0 | |

The first CF1 rule is compared to CF2 rule 1:
The protocol types are not the same then these rules cannot be merged.
The first CF1 rule is compared to CF2 rule 2:
The CF1 rule 1 is included in CF2 rule 2, then these rules can be merged: CF1 Rule 1 is kept.
The second CF1 rule is compared to CF2 rule 1
The CF2 rule 1 is included in CF1 rule 2, then these rules can be merged: CF2 Rule 1 is kept.
The third CF1 rule is compared to CF2 rule 1
The Action fields are not the same then these rules cannot be merged.
The third CF1 rule is compared to CF2 rule 2
The Action fields are not the same then these rules cannot be merged.
The third CF1 rule is compared to CF2 rule 3
The Action fields are not the same then these rules cannot be merged.

In this example, the common configuration file CF12 got after rules comparison and merging is the following:

| Permit | TCP | 172.20.0.0 | 192.0.0.0 |
| Permit | ICMP | 172.0.0.0 | 192.168.0.0 |
| Deny | IP | 192.168.10.0 | 192.168.20.0 |
| Permit | UDP | 172.0.0.0 | 192.0.0.0 |

The invention claimed is:

1. A firewall system for interconnecting a first IP network to a second IP network, wherein a data packet transmitted or received by the first IP network is filtered by using a first firewall function and a data packet transmitted or received by the second IP network is filtered by using a second firewall function, the firewall system comprising:

a console port for enabling an administrator to administer each IP network and to enter filtering rules for updating the associated firewall function;

control means for interconnecting to the console port;

a firewall device in communication with the console port, and comprising a filtering means for performing both the first firewall function and the second firewall function, and for transmitting filtering rules so that each administrator of the first IP network and the second IP network independently manages their respective networks from the console port;

wherein the filtering means further comprises a first filtering unit for performing the first filtering function and a second filtering unit for performing the second firewall function; and a second network address translation unit interconnected between the second IP network and the second filtering unit for changing a destination IP address of a packet transmitted to the second IP network and for changing the source IP address of a packet received from the second IP network.

2. The firewall system of claim 1, further comprising an IP gateway interconnected between the first filtering unit and the second filtering unit for determining the routing rules to be applied to data packets, and a routing control point in communication with the IP gateway for providing routing rules.

3. The firewall system of claim 1, comprising a first IP gateway in communication with the first IP network for retrieving routing rules from a first routing control point, and a second IP gateway in communication with the second IP network for retrieving routing rules from a second routing control point.

4. The firewall system of claim 3, wherein said control means includes a common control unit connected to the console port for identifying the administrator entering filtering rules through the console port, and a first control unit and a second control unit respectively in communication with the first and second IP networks, for managing the filtering rules.

5. The firewall system of claim 4, further comprising a merge unit connected to the first control unit and to the second control unit for determining whether a rule entered by an administrator is redundant with respect to one of the rules entered by the other administrator.

6. The firewall system of claim 5, wherein the merge unit determines whether to merge two rules when the two rules correspond to the same action, the same protocol, the same port number, or when there is an overlapping source address and/or destination address.

7. The firewall system of claim 6, wherein the merge unit determines whether two rules are identical and if so, transmits one of the rules to a common rule configuration file to be used as filtering rule for both the first and second firewall functions.

8. The firewall system of claim 7, wherein the merge unit determines whether one of two rules is included in the other rule, when the rules are not identical and if so, transmits the included rule to the common rule configuration file.

9. The firewall system of claim 8, wherein a tag is added to each rule before sending the rule to the common rule configuration file, the tag being used to identify the type of rule as determined by the merge unit.

10. The firewall system of claim 9, wherein the merge unit compares a rule entered by the administrator with a subsequent rule entered by the other administrator when the merge unit decides not to merge the two rules and stops comparing when the merge unit decides to merge the rules.

11. The firewall system of claim 10, wherein the firewall device comprises a first firewall device and a second firewall device which are functionally identical for processing respectively the data packets in the data path from the first IP network to the second IP network and the data packets in the data path from the second IP network and the first IP network.

* * * * *